(12) United States Patent
Nadarthur Sreenivasan

(10) Patent No.: US 9,971,611 B2
(45) Date of Patent: May 15, 2018

(54) MONITORING A MOBILE DEVICE APPLICATION

(71) Applicant: AppDynamics LLC, San Francisco, CA (US)

(72) Inventor: Ajay Kumar Nadarthur Sreenivasan, Union City, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days. days.

(21) Appl. No.: 14/530,554

(22) Filed: Oct. 31, 2014

(65) Prior Publication Data

US 2016/0124757 A1   May 5, 2016

(51) Int. Cl.
*G06F 9/445* (2018.01)
*G06F 11/34* (2006.01)
*G06F 9/455* (2018.01)

(52) U.S. Cl.
CPC ...... *G06F 9/44521* (2013.01); *G06F 9/45504* (2013.01); *G06F 11/3466* (2013.01); *G06F 2201/865* (2013.01)

(58) Field of Classification Search
None
See application file for complete search history.

(56) References Cited

U.S. PATENT DOCUMENTS

| | | | | |
|---|---|---|---|---|
| 7,546,128 B2* | 6/2009 | Smith | ................... | G08G 1/0104 340/870.01 |
| 2006/0218533 A1* | 9/2006 | Koduru | ............... | G06F 11/3447 717/124 |
| 2007/0067373 A1* | 3/2007 | Higgins | ............... | G06F 11/3013 |
| 2008/0119159 A1* | 5/2008 | Ruff | ........................ | H04M 1/24 455/343.1 |
| 2010/0057843 A1* | 3/2010 | Landsman | .......... | H04L 63/0407 709/203 |
| 2010/0077035 A1* | 3/2010 | Li | ........................... | H04L 67/02 709/206 |
| 2011/0047594 A1 | 2/2011 | Mahaffey et al. | | |
| 2012/0102477 A1* | 4/2012 | Kim | ........................ | G06F 8/665 717/169 |
| 2012/0253745 A1 | 10/2012 | Dhanapal et al. | | |

(Continued)

FOREIGN PATENT DOCUMENTS

WO   PCT/US2015/13867   1/2015

OTHER PUBLICATIONS

PCT Application No. PCT/US2015/013867 International Search Report and Written Opinion dated Apr. 23, 2015.

*Primary Examiner* — Daxin Wu
(74) *Attorney, Agent, or Firm* — Parker Ibrahim & Berg LLP; James M. Behmke; Stephen D. LeBarron

(57) ABSTRACT

The present technology allows for a mobile device operating system to be modified in order to better monitor the performance of the mobile device applications. A mobile device file, such as a dex file for android operating system, may be extracted from an APK file for an application. The mobile device file may be analyzed, and a new mobile device file may be generated in addition to the analyzed mobile device file. The modifications may include identifying methods that should be monitored during execution of the corresponding application on a mobile device. The mobile device file, may be modified at a remote server, provided back to the mobile device, and then loaded by the mobile device at a later time.

18 Claims, 6 Drawing Sheets

(56) References Cited

U.S. PATENT DOCUMENTS

| | | | |
|---|---|---|---|
| 2013/0232540 A1* | 9/2013 | Saidi | G06F 21/6218 726/1 |
| 2014/0006809 A1* | 1/2014 | Udeshi | G06F 9/5094 713/300 |
| 2014/0096186 A1* | 4/2014 | Barton | H04L 67/10 726/1 |
| 2014/0137080 A1 | 5/2014 | Huang et al. | |
| 2014/0181803 A1* | 6/2014 | Cooper | G06F 8/60 717/178 |
| 2014/0181974 A1* | 6/2014 | Yablokov | G06F 21/566 726/23 |
| 2015/0201331 A1* | 7/2015 | Raleigh | G06Q 10/06375 726/3 |
| 2016/0048861 A1* | 2/2016 | Morgaine | G06Q 30/0207 705/14.16 |

* cited by examiner

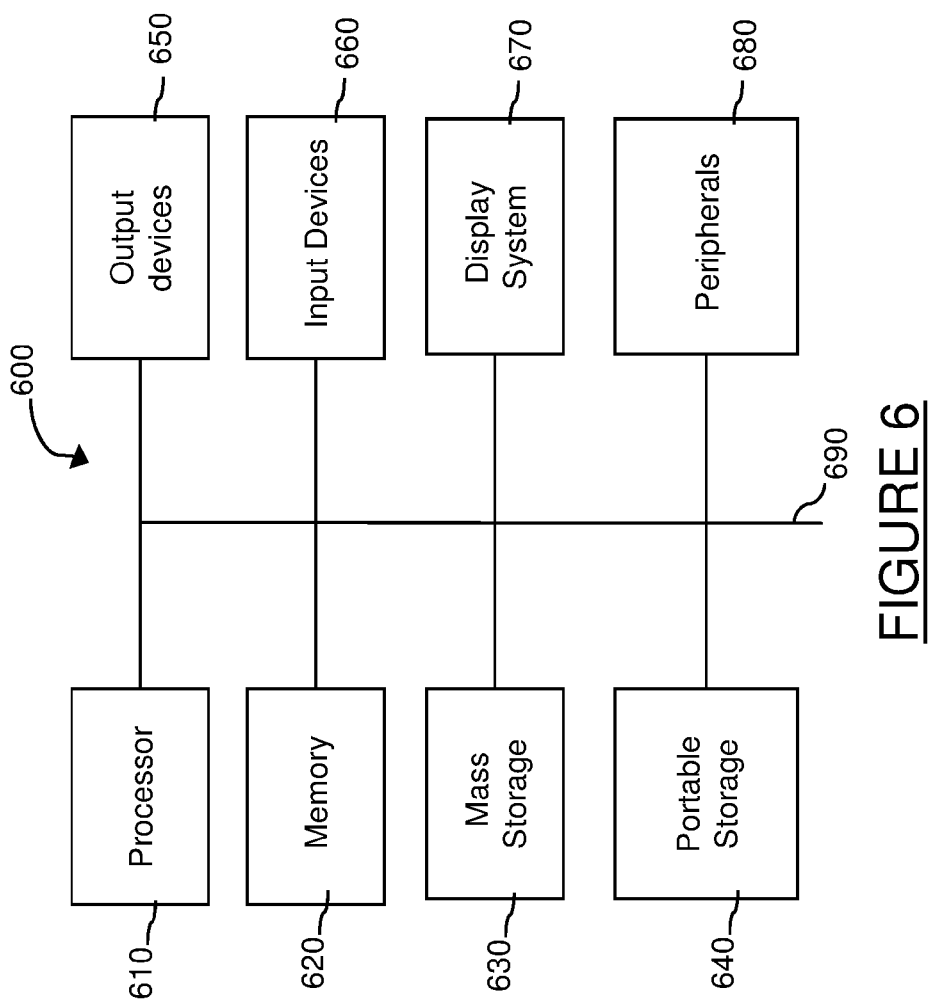

MONITORING A MOBILE DEVICE APPLICATION

BACKGROUND OF THE INVENTION

The World Wide Web has expanded to provide web services faster to consumers. Web services may be provided by a web application which uses one or more services to handle a transaction. The applications may be distributed over several machines, making the topology of the machines that provides the service more difficult to track and monitor.

Web services provided by applications implemented in JAVA programming language are easy to manipulate and instrument code in. Most mobile device operating systems, however, are not as flexible. Most mobile devices do not have much memory and resources, and therefore mobile device applications are susceptible to delays if there are too many changes or modifications made to the operating system code. Further, the operating systems and platforms of mobile devices are designed to be compact and operate as fast as possible with low overhead. What is needed is a way to modify the structure of a mobile device platform in order to better monitor application performance on the mobile device.

What is needed is an improved method for informing an administrator of the performance of an application managed by the administrator.

SUMMARY

The present technology allows for a mobile device operating system to be modified in order to better monitor the performance of the mobile device applications. A mobile device file, such as a dex file for android operating system, may be extracted from an APK file for an application. At runtime, using hooks introduced at compile time instrumentation, the agent is able to load classes dynamically from the generated dex file. The mobile device file may be analyzed, and a new mobile device file may be generated in place of the analyzed mobile device file. The modifications may include identifying methods that should be monitored during execution of the corresponding application on a mobile device. The mobile device file, such as a dex file, may be modified at a remote server, provided back to the mobile device, and then loaded by the mobile device at a later time.

An embodiment may include a method for monitoring an application. The method may be being with receiving information regarding methods to monitor. A new mobile device file may be generated, wherein the methods to be monitored encompassed in a sub-class in the new mobile device file. The new mobile device file may be provided to the mobile device, the new mobile device file loaded and instantiated at the mobile device.

An embodiment may include a system for monitoring a business transaction. The system may include a processor, a memory and one or more modules stored in memory and executable by the processor. When executed, the one or more modules may receive information regarding methods to monitor, generate new mobile device file, the methods to be monitored encompassed in a sub-class in the new mobile device file, and provide the new mobile device file to the mobile device, the new mobile device file loaded and instantiated at the mobile device.

BRIEF DESCRIPTION OF THE DRAWINGS

FIG. 6 is a block diagram of a computing environment for implementing the present technology.

DETAILED DESCRIPTION

The present technology allows for a mobile device operating system to be modified in order to better monitor the performance of the mobile device applications. A mobile device file, such as a dex file for android operating system, may be extracted from an APK file for an application. The mobile device file may be analyzed, and a new mobile device file may be generated in addition to the analyzed mobile device file. The modifications may include identifying methods that should be monitored during execution of the corresponding application on a mobile device. The mobile device file, such as a dex file, may be generated at a remote server, provided back to the mobile device, and then loaded by the mobile device at a later time.

Figure 1:
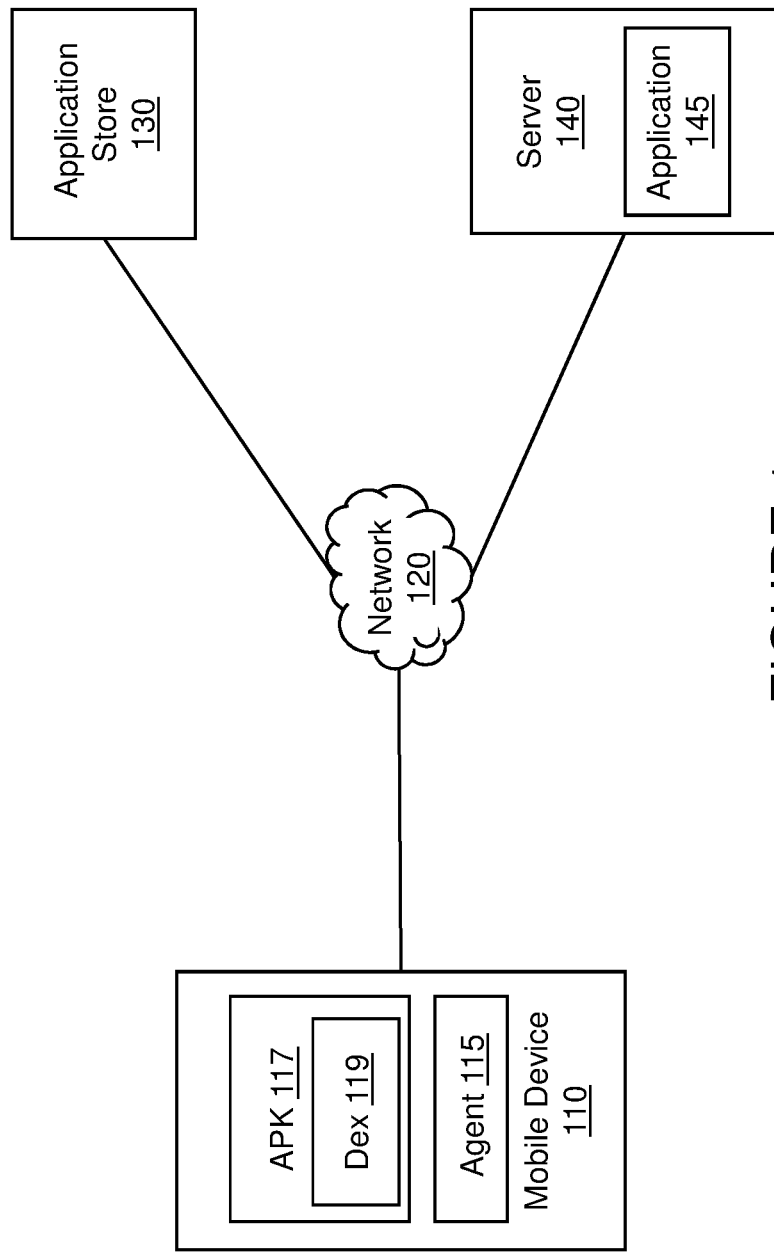
FIG. 1 is a block diagram of a system for monitoring a mobile device application.

FIG. 1 is a block diagram of a system for monitoring a mobile device application. The system of FIG. 1 includes mobile device 110, network 120, application store 130, and server 140. Mobile device 110 may download an application from mobile device store 130 over network 120 and execute the application. The mobile device application may include an APK file which may include other mobile device files. If the mobile device has an Android operating system, the additional mobile device files may include a dex file.

To monitor a mobile device application, the application APK file is instrumented at compile time such that new classes generated by application 145 can be loaded at runtime. Thus, once an APK file 117 is published by the developer to the mobile device store, the APK file may be uploaded to server 140. An application 145 at server 140 may allow a user to define information points at which the mobile device operating system can be monitored. The information points may correspond to one or more threads, objects, methods, or other elements of the operating system to monitor during operation of the mobile device. Application 145 may receive the information point system, generate one or more new mobile application files, such as a dex file, generate a new APK file with the updated mobile application files, and provide the updated APK file to mobile device 110.

Figure 2:
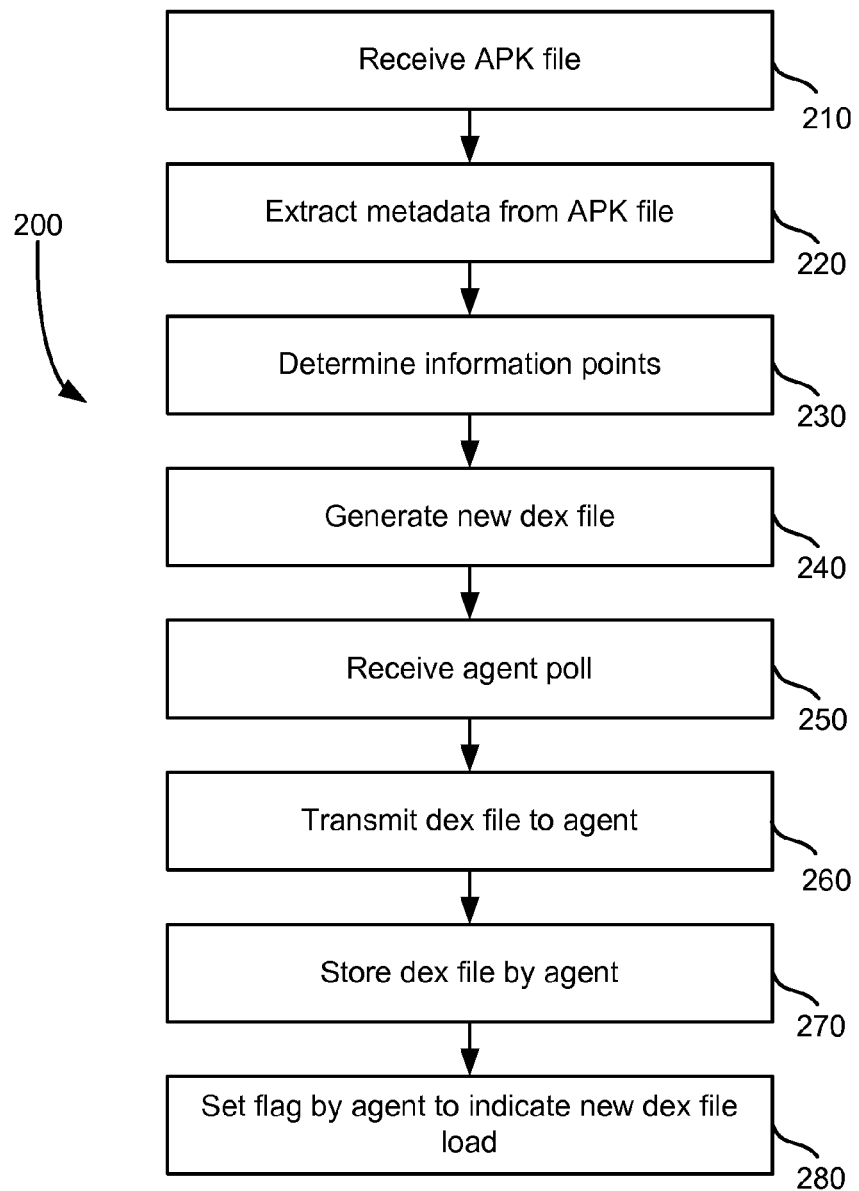
FIG. 2 is a method for modifying a mobile device operating system.

FIG. 2 is a method for configuring a mobile device operating system to be monitored. First, an APK file is received, for example from the developer of the application, by the remote server at step 210. The APK file may be received from the mobile device upon a new release or the initial purchase for acquisition of the application. Metadata may be extracted for methods and classes contained in the received APK file at step 220. The metadata may include information on methods and classes suitable to be modified with a sub-class (i.e., wrapper).

Information points may be defined at step 230. The information points may include one or more methods, threads, or other elements of the APK file suitable to be monitored during execution of the APK file on the mobile device. More details for defining information points is discussed in more detail below with respect to the method of FIG. 3.

A new dex file with additional information points is generated at step 240. The new dex file is generated from the information points defined at step 230. The new dex file may include information points already included in the APK file plus those defined at step 30. Generating a new dex file is discussed in more detail with respect to the method of FIG. 4.

A poll may be received from an agent on the mobile device at step 250. The poll may be regarding any information point changes made to the APK. Upon receiving the poll, a new dex configuration may be transmitted to the android device agent at step 260. In some instances, in response to the poll, the server may transmit information to the mobile device to indicate the presence of a newly generated dex file to the agent. The new dex file may be transmitted to the agent in response to the mobile device's confirmation or receipt of the information.

The dex file may be stored at the android mobile device at step 270. The agent on a mobile device then may set a flag to indicate that new information points are enabled and that the new dex file should be loaded upon the next application restart at step 290.

Figure 3:
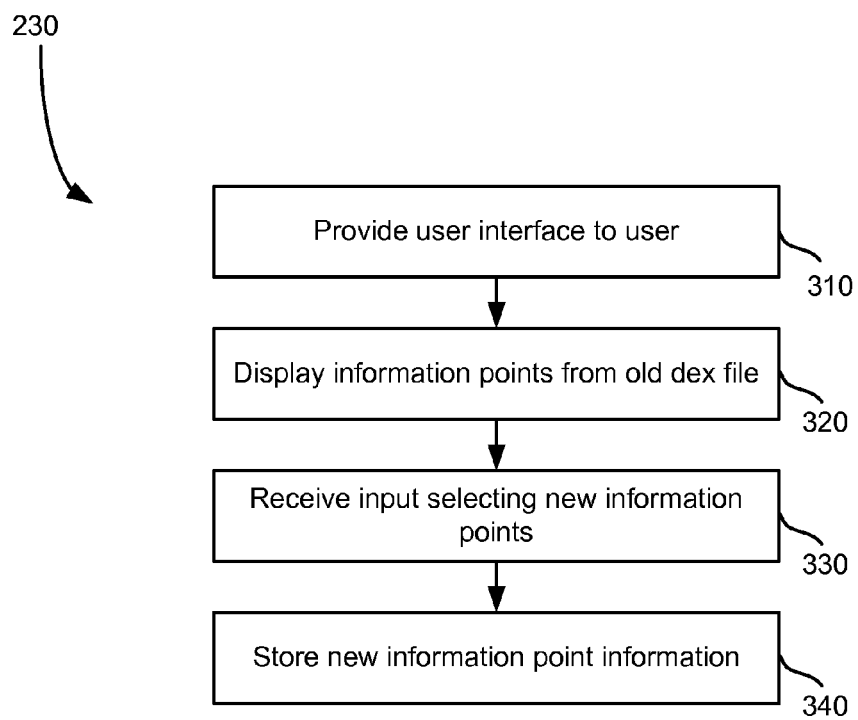
FIG. 3 is a method for defining information points within a mobile device file.

FIG. 3 is a method for defining information points. The method of FIG. 3 provides more detail for step 230 of the method of FIG. 2. First, a user interface is provided to a user at step 310. Information points already present in the uploaded dex file are then displayed in the user interface at step 320. Input may then be received through the user interface for additional information points at step 330. The additional information points relate to methods and threads that should be monitored moving forward. The additional information regarding the information points is then stored at step 340.

Figure 4:
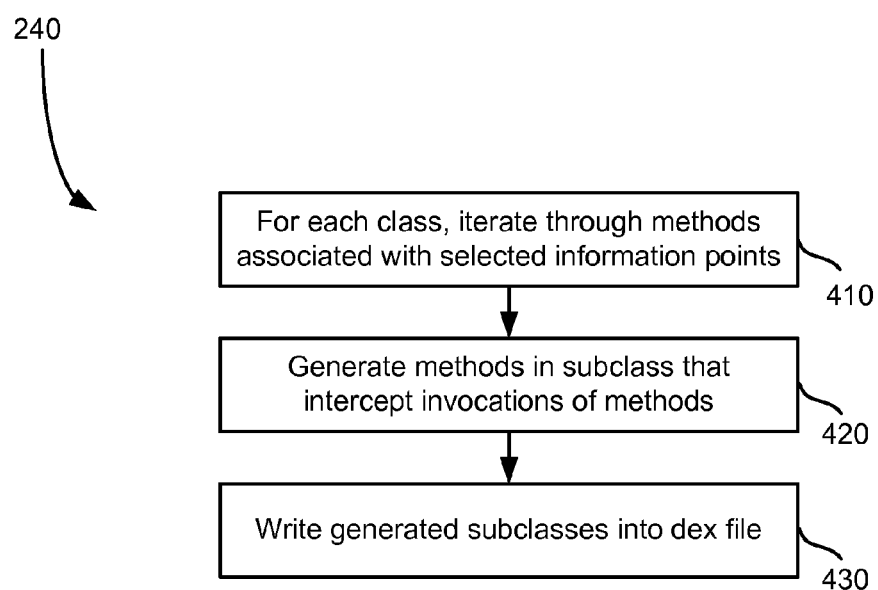
FIG. 4 is a method for generating a new dex file.

FIG. 4 provides a method for generating a new dex file. Once the information points have been defined, for each class, an application on server 140 may iterate through methods requested by a user at step 410. Methods may then be generated in a subclass that intercepts all invocations of the particular information point at step 420. Generated subclasses are then written into the dex file at step 430.

Figure 5:
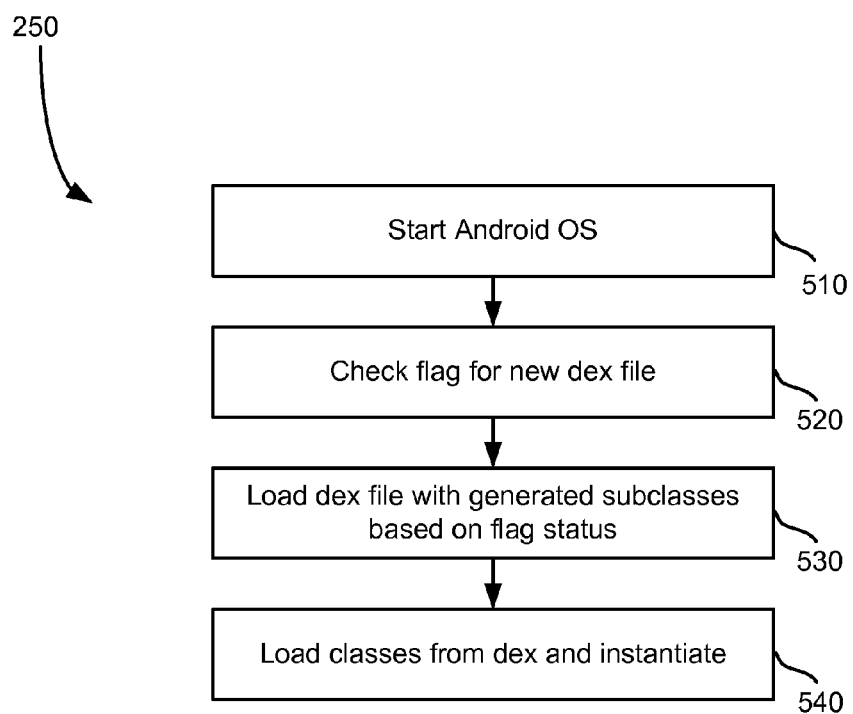
FIG. 5 is a method for loading a dex file onto a mobile device.

Once the new dex file has been received by the mobile device, the dex file may be loaded. The method of FIG. 5 provides more detail for loading a dex file. The mobile device operating system may be started at step 510. In some instances, the mobile device operating system may be an android operating system. A Boolean flag is checked to determine if a new dex file should be loaded at startup at step 520. If the Boolean flag is turned on, the dex file is then loaded with the generated subclasses at step 530. The classes are then dynamically loaded from the dex file and instantiated at step 540.

FIG. 6 is a block diagram of a computing environment for use with the present technology. System 600 of FIG. 6 may be implemented in the contexts of the likes of client 110, application store 130 and server 140. FIG. 6 is intended as a general description for exemplary purposes only. A system similar to that in Figure may be used to implement mobile device 110, but may include additional components such as an antenna, additional microphones, and other components typically found in mobile devices such as a smart phone or table computer.

The computing system 600 of FIG. 6 includes one or more processors 610 and memory 620. Main memory 620 stores, in part, instructions and data for execution by processor 610. Main memory 620 can store the executable code when in operation. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. However, the components may be connected through one or more data transport means. For example, processor unit 610 and main memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 can store the system software for implementing embodiments of the present invention for purposes of loading that software into main memory 610.

Portable storage device 640 operates in conjunction with a portable non-volatile storage medium, such as a floppy disk, compact disk or Digital video disc, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network interfaces, and monitors.

Display system 670 may include an LED, liquid crystal display (LCD) or other suitable display device. Display system 670 receives textual and graphical information, and processes the information for output to the display device.

Peripherals 680 may include any type of computer support device to add additional functionality to the computer system. For example, peripheral device(s) 680 may include a modem or a router.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including UNIX operating system, LINUX operating system, WINDOWS operating system, MACINTOSH operating system, PALM operating system and other suitable operating systems.

When implementing a mobile device such as smart phone or tablet computer, the computer system 600 of FIG. 6 may include one or more antennas, radios, and other circuitry for communicating over wireless signals, such as for example communication using Wi-Fi, cellular, or other wireless signals.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for monitoring a mobile application at a mobile device, the method including:
   extracting, by a server, a mobile device file from an application package format file that is associated with the mobile application of the mobile device;
   analyzing, by the server, the extracted mobile device file to extract metadata that includes information on methods contained in the application package format file suitable to be modified with a wrapper and monitored;
   providing, by the server, a user interface to display preexisting information on the methods contained in the application package format file already identified for monitoring;
   receiving, by the server, through the user interface, input identifying additional methods to be monitored going forward;
   generating, by the server, a new mobile device file that includes at least the additional methods in the wrapper in the new mobile device file;
   receiving, at the server, a poll from an agent on the mobile device regarding changes to the application package format file; and
   in response to receiving the poll, transmitting, by the server, the new mobile device file to the agent on the mobile device to cause the mobile device to set a flag indicating that the additional methods are enabled and that the new mobile device file should be loaded upon a next application restart.

2. The method of claim 1, wherein the new mobile device file includes a dex file for an android operating system.

3. The method of claim 1, wherein the application package format file includes a APK file.

4. The method of claim 1, wherein the wrapper includes a sub-class wrapper.

5. The method of claim 1, wherein generating the new mobile device file includes generating the new mobile device file to include methods already identified to be monitored found in the analyzed mobile device file in addition to the methods identified from the input received through the user interface.

6. The method of claim 1, including:
   generating a new application package format file that includes the new mobile device file; and
   providing the new application package file that includes the new mobile device file to the agent on the mobile device.

7. A non-transitory computer readable storage medium having embodied thereon a program, the program being executable by a processor on a sever to perform a method for monitoring a mobile application, the method including:
   extracting a mobile device file from an application package format file that is associated with the mobile application of the mobile device;
   analyzing the extracted mobile device file to extract metadata that includes information on methods contained in the application package format file suitable to be modified with a wrapper and monitored;
   providing a user interface to display preexisting information on the methods contained in the application package format file already identified for monitoring;
   receiving through the user interface, input identifying additional ones of the methods to be monitored going forward;
   generating a new mobile device file that includes at least the additional methods in the wrapper in the new mobile device file;
   receiving, at the server, a poll from an agent on the mobile device regarding changes to the application package format file; and
   in response to receiving the poll, transmitting the new mobile device file to the agent on the mobile device to cause the mobile device to set a flag indicating that the additional methods are enabled and that the new mobile device file should be loaded upon a next application restart.

8. The non-transitory computer readable storage medium of claim 7, wherein the new mobile device file includes a dex file for an android operating system.

9. The non-transitory computer readable storage medium of claim 7, wherein the application package format file includes a APK file.

10. The non-transitory computer readable storage medium of claim 7, wherein the wrapper includes a sub-class wrapper.

11. The non-transitory computer readable storage medium of claim 7, wherein generating the new mobile device file includes generating the new mobile device file to include methods already identified to be monitored found in the analyzed mobile device file in addition to the methods identified from the input received through the user interface.

12. The non-transitory computer readable storage medium of claim 7, including: generating a new application package format file that includes the new mobile device file; and providing the new application package file that includes the new mobile device file to the agent on the mobile device.

13. A system for monitoring a mobile application, the system including:
   a processor;
   a memory; and
   one or more modules stored in memory and executable by a processor to perform operations including:
      extract a mobile device file from an application package format file that is associated with the mobile application of the mobile device;
      analyze the extracted mobile device file to extract metadata that includes information on methods contained in the application package format file suitable to be modified with a wrapper and monitored;
      provide a user interface to display preexisting information on the methods contained in the application package format file already identified for monitoring;
      receive through the user interface, input identifying additional ones of the methods to be monitored going forward;
      generate a new mobile device file that includes at least the additional methods in the wrapper in the new mobile device file;
      receive a poll from an agent on the mobile device regarding changes to the application package format file; and
      in response to the received poll, transmit the new mobile device file to the agent on the mobile device to cause the mobile device to set a flag indicating that the additional methods are enabled and that the new mobile device file should be loaded upon a next application restart.

14. The system of claim 13, wherein the new mobile device file includes a dex file for an android operating system.

15. The system of claim 13, wherein the application package format file includes a APK file.

16. The system of claim 13, wherein the wrapper includes a sub-class wrapper.

17. The system of claim 13, wherein generating the new mobile device file includes generating the new mobile device file to include methods already identified to be monitored found in the analyzed mobile device file in addition to the methods identified from the input received through the user interface.

18. The system of claim 13, including:
generating a new application package format file that includes the new mobile device file; and
providing the new application package file that includes the new mobile device file to the agent on the mobile device.

\* \* \* \* \*